Nov. 16, 1965     A. C. SCAVULLO     3,217,635
SHASHLIK SWORD
Filed Aug. 16, 1963
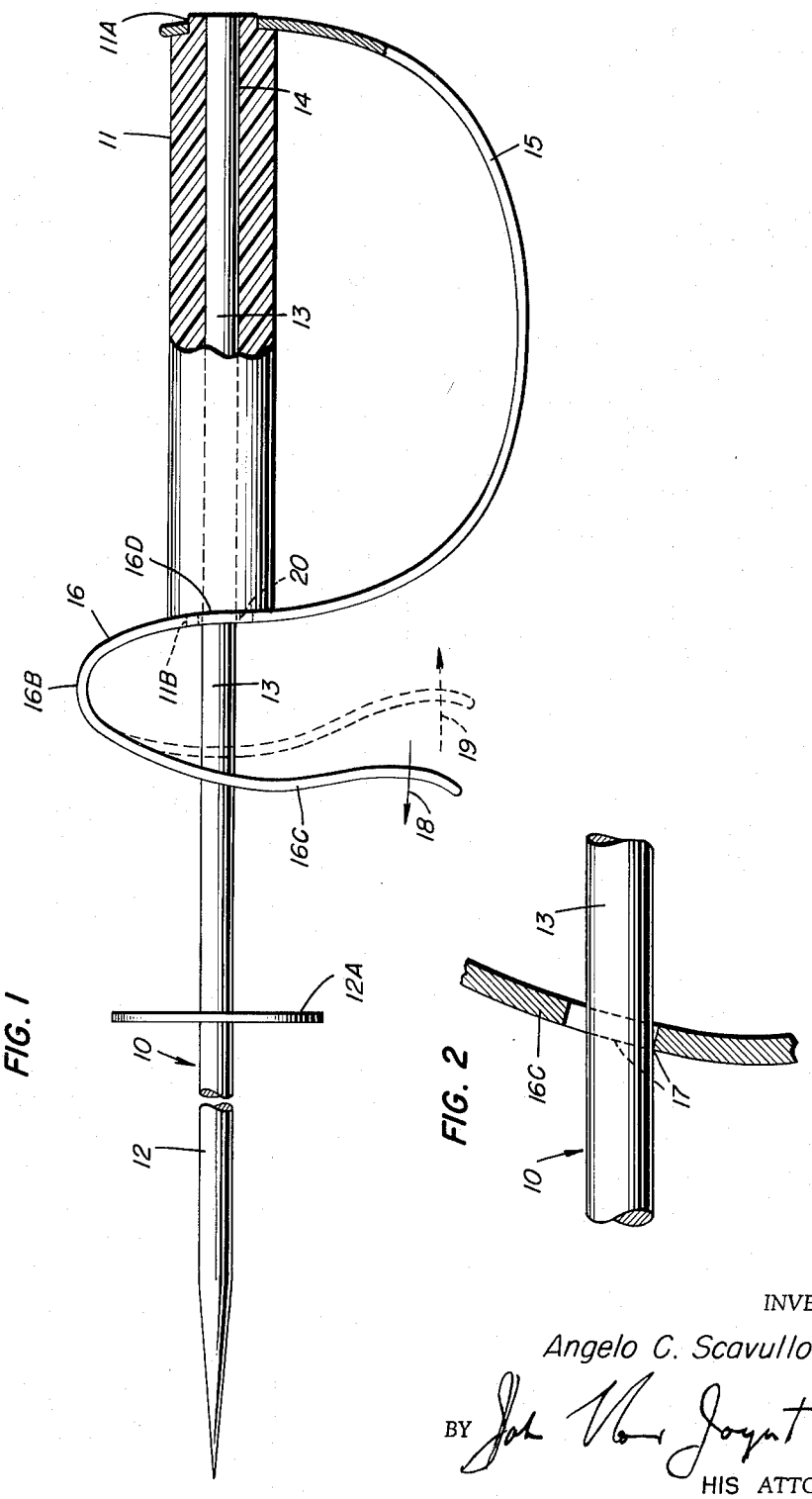
INVENTOR
Angelo C. Scavullo
BY *John Norm Joynt*
HIS ATTORNEY

United States Patent Office 3,217,635
Patented Nov. 16, 1965

3,217,635
SHASHLIK SWORD
Angelo C. Scavullo, Jamaica, N.Y., assignor to Legion Utensils Co., Inc., a corporation of New York
Filed Aug. 16, 1963, Ser. No. 302,636
1 Claim. (Cl. 99—419)

My invention relates generally to culinary equipment for use both in the home and in the restaurant. It has particular application to a shashlik, shishkabab or similar sword, of new and improved construction.

Among the objects of my invention is the provision of a two-part shashlik sword or the like wherein any one of a series of blades removably locks, as required, into a related hilt with its included guard, which hilt is common to all said blades; which assembly of blade and hilt is simple, inexpensive, sturdy and of long, useful life; which is relatively foolproof, and is readily assembled and disassembled as required; which in disassembly permits cooking, over a open flame, of foodstuffs impaled on the blade without heating the handle or in any way involving the same; and which in assembly, possesses all requisite rigidity in use, with almost total absence of play between the several parts of the assembly and without endangering a loss of foodstuffs in handling.

Accordingly, my invention resides in the combination of elements of the two-part sword assembly, in the arrangement of parts, and in the features of each of the several parts, as well as in the relation of each of the same with one or more of the other parts of the assembly, the scope of the application of all of which is more fully recited in the claims at the end of this specification.

In the several views of the drawings, wherein I disclose that embodiment of my invention which I presently prefer:

FIG. 1 is an elevational view of an assembled hilt and related blade, the blade being disclosed as removably locked, rigidly in position, within the hilt of the sword; and FIG. 2 is a fragmentary elevational view, disclosing the relation between the blade of the sword and the spring-like locking element which I provide on the hilt of the sword.

Throughout the views of the drawings, like reference characters denote like structural parts.

As conducive to a more ready understanding of certain features of my invention, it may be noted that there are a variety of entrees which are cooked at home or in the restaurant, several at the table, swathed in flame. Caucasian shashlik and shishkabab are typical. A plurality of chunks of marinated lamb or other selected meat product are impaled on the sword or skewer. These chunks of meat are interspersed with onions and other vegetables. The sword or skewer is exposed to an open flame for cooking, after which the sword is brought flaming to the table. While such flaming in itself comprises no part of my invention, it may be noted that this is usually accomplished through igniting, immediately before serving, a piece of cotton which, first dipped in alcohol, is wrapped around the base of the sword near the hilt thereof.

Thus, the typical shashlik sword or skewer comprises the integral assembly of related blade and hilt portions, made permanently fast to each other. Each sword is complete in itself. Each blade is fast to its related hilt. Each sword may be used for shashlik, shishkabab, or similar entree. But practical difficulty is encountered in presenting the sword to the open cooking flame, without unduly heating the handle and in preparing the sword for serving the entrees, as well as in washing and sterilizing the same following each use.

From the foregoing, it now becomes evident that an object of my invention is to simplify, make more practical and to increase speed of preparation of the sword, with foodstuffs impaled thereon for cooking before an open flame and for serving at the table, and in so doing to provide a two-part sword assembly which lends itself to ready cleaning and sterilizing the blades thereof, at the same time assuring a cool handle ready for table serving of blade with foodstuffs, all the foregoing being accomplished by relating a single hilt to a plurality of separate and removable blade elements in simple and direct manner, wherein the hilt rigidly yet removably locks the particular blade related thereto in proper assembly, and wherein each such blade, as and when desired, can be readily and freely released from the hilt.

Referring now more particularly to the practice of my invention, attention is directed to FIG. 1 thereof. I indicate there a shashlik sword with blade generally at 10. Blade 10 is separable from the hilt, indicated generally at 11. Blade 10 comprises a portion 12 on which are impaled the chunks of foodstuffs to be cooked and served and a butt portion 13. The butt of the shaft 10 is in assembly with hilt 11, the blade then terminating in hilt 11. Hilt 11 which the user, that is, the waiter, clasps in his hand when the sword is in use and is being held upright, is hollow. It is provided with a central bore or well 14, open at that end of hilt 11 which accommodates the butt of blade 10, which butt extends through at least part of the length of hilt 11. In the embodiment illustrated, I provide for bore 14 extending entirely through hilt 11.

Preferably, but not necessarily, I form hilt 11 as a cylindrical member. Conveniently, however, hilt 11 may be tapered along its length or where desired, may be contoured to a shape complemental to that of the user's clasp, thereby insuring firmer grip. I impart cross-sectional dimentions to both butt 13 and bore 14 such that the butt is received nicely within well 14, with retained capability, however, for free relative movement.

Guard 15 encircles hilt 11 and is made fast to each end 11A, 11B thereof. In the embodiment of FIG. 1 guard 15 serves the dual function of not only affording some protection to the hand of the user, but of comprising one part of a spring grip whereby the butt of blade 10 is releasably and removably locked within the well 14 of hilt 11. In the present embodiment I form guard 15 of suitable metal, preferably stainless steel, conveniently of spring quality.

Where desired, the handle or hilt 11 may itself be conveniently fashioned of a suitable plastic, the central bore or well 14 being molded, drilled or otherwise formed therein.

The guard 15 terminates in loop 16 extending beyond the fastening to hilt 11 as at 11B, by molding, press-fit or the like. Loop 16, itself, is somewhat U-shaped, having a central yoke 16B and a free arm portion 16C. This latter portion is flared slightly outwardly from the central yoke 16B, when loop 16 is in its untensioned position, due to the biasing action of the spring metal. In arm 16C (see FIG. 2) I provide a small aperture 17 slightly larger in dimension than the cross-sectional dimensions of the butt 13 of blade 10. In this connection it may be noted that while preferably the bore 14 in hilt 11, the aperture 17 in arm 16C and the butt of blade 10 all are circular in cross-section, other suitable configuration, of which elliptical, rectangular or square cross-section are but typical, may be used. Should recourse to any of these latter constructions be had, the configuration of the well 14 of hilt 11, of aperture 17 of the spring end 16 of guard 15 and the cross-section of blade butt 13, will be closely complemental to each other.

The spring action or bias of loop 16 is such that, when unflexed and with butt of blade 10 inserted through aperture 17 to an extent sufficient to seat the butt firmly in well 14, the arm 16C departs to slight extent from a fully perpendicular relation to the blade, that is, it forms an angle with respect to butt 13 (see FIG. 2). This departure causes the butt to bind against the edges of arm 16C defining the aperture 17 therein. This locks the butt 13 firmly in position within well 14. Despite such locking action, however, and despite the binding effect imparted by arm 16C to butt 13, this latter is prevented from canting within well 14, due to the nice dimensioning of the butt and well 14 with respect to each other, this together with sufficient depth imparted to well 14. The outward-flaring tendency of arm 16C in locking position with respect to blade 10 is clearly indicated by arrow 18 in FIG. 1.

Where desired, sword hilt is removed from blade 10, this by merely flexing the bottom, free extremity of arm 16C, as by finger pressure or the like, toward the hilt 11. This is best indicated by arrow 19 in FIG. 1. With finger pressure thus applied to arm 16C against the bias of the spring metal from which this latter is formed, arm 16C assumes a position almost fully perpendicular to blade 10, as indicated by dotted lines in FIG. 1. With arm 16C thus disposed normally or nearly normally to blade 10, butt 13 no longer binds in aperture 17. And, since aperture 17 is larger in dimension than butt 13, as already pointed out, the hilt 11 can be freely withdrawn longitudinally of the shaft. Upon removal of the hilt, to the right in FIG. 1, hilt and blade are completely separated, the sword is dismantled.

While the particular blade 10 is undergoing washing and recharging blade portion 12 with a new supply of foodstuffs impaled thereon, at the same time another shashlik blade, fully laden with foodstuffs thereon, can be mounted, or picked up by the hilt 11, thus reconditioning the sword assembly for ignition and flaming. It is intended, of course, that hilt 11 be maintained at all times in a clean and sanitary condition. Nevertheless, the same high degree of cleanliness, free of contact by the hand, demanded of blade 10 is not required of hilt 11.

Where desired, and as disclosed in FIG. 1, I intend the flexible and apertured spring leaf 16 to be formed integrally with and as a continuation of guard 15. Thus, in the embodiment disclosed in FIG. 1 guard 15 and loop 16 are constructed of a single strip of spring metal having reverse loops formed therein somewhat in the manner of a double U, the elements of which are reversed with respect to each other. This may be considered somewhat as an S-like member with its major axis disposed horizontally. With such construction, the leg 16D of loop 16 is provided with an aperture 20 similar to the aperture 17 in arm 16C. Shaft-butt 13 passes through the two apertures 17 and 20, seating in the bottom of the well 14 at the outer end of hilt 11.

From the foregoing it becomes evident that it is a matter of but a moment to flex arm 16C toward hilt 11 (FIG. 1), against the bias of the spring metal of which the loop 16 is formed, and to accept the butt of blade 10 through aperture 17 in this arm 16C while the latter is finger-pressed in flexed position. With the blade 10 properly positioned, then upon the release of finger pressure on arm 16C, the latter tends to resume its rest position under the normal bias of the spring loop 16.

Arm 16C returns to its rest position and in so doing, arm 16C at the margins of aperture 17 binds against butt 13, removably locking it firmly in position, permitting an ease of handling the shaft with or without foodstuffs impaled on the blade.

Thus it will be seen that I provide in my invention a shashlik sword in which the objects set out above are fully achieved. My new construction is seen to be quite simple. It becomes evident that a single handle or hilt for the sword will suffice to serve a plurality of related but removable sword blades. These blades can be charged with chunks of selected foodstuffs impaled thereon, conditioning the blade for service in assembly with the hilt, as and when desired. Only a minimum of time is required to remove the hilt from one blade and to relate the hilt with another blade in its place.

All the foregoing, as well as many other highly practical advantages attend the practice of my invention.

It is apparent from the foregoing that once the broad aspects of my invention are disclosed, many embodiments thereof will readily occur to those skilled in the art to which the invention relates. Moreover, many modifications of the disclosed embodiment, all falling within the scope of my invention, will occur to them. Accordingly, the foregoing disclosure is to be considered as merely illustrative and not by way of limitation.

I claim as my invention:

A two-part shashlik sword comprising a hollow hilt with included guard and a reverse U-shaped clip with included arms formed as a continuation of said guard, the guard and U-shaped clip being formed of spring metal, and the U-shaped clip having such spring bias that the free arm thereof is flared slightly outwardly, both arms of said clip having apertures therein; and a blade with included butt portion slightly smaller in cross-sectional dimensions than the dimensions of said apertures and the cross-sectional dimensions of the hollow interior of said hilt, said blade being removably and dismantleably fast by said butt portion thereof which passes through the apertures of said clip into the hollow portion of said hilt, and being locked into position through binding action against the arms of said clip.

References Cited by the Examiner
UNITED STATES PATENTS

| | | | |
|---|---|---|---|
| 35,292 | 5/1862 | Bogia | 30—295 X |
| 649,493 | 5/1900 | Stohlmann et al. | 30—329 |
| 2,382,774 | 8/1945 | Coffin | 99—419 |
| 2,544,563 | 3/1951 | Moehle | 30—295 |
| 2,624,111 | 1/1953 | Weeks | 30—295 |
| 2,766,681 | 10/1956 | Rigo | 99—419 |
| 2,861,371 | 11/1958 | Leshik | 30—366 X |
| 2,935,013 | 5/1960 | Onori | 99—419 |
| 3,078,787 | 2/1963 | Arseneault | 99—419 |

References Cited by the Applicant
UNITED STATES PATENTS

| | | |
|---|---|---|
| 2,950,888 | 8/1960 | Cottrill. |

ROBERT E. PULFREY, *Primary Examiner.*

LAWRENCE CHARLES, EUGENE R. CAPOZIO,
*Examiners.*